Dec. 21, 1954 J. EVANS 2,697,742

SWITCHING APPARATUS

Filed May 29, 1950 2 Sheets-Sheet 1

INVENTOR
John Evans
BY
Chas. V. Whiteley
ATTORNEY

INVENTOR
John Evans
BY
ATTORNEY 2,697,742

SWITCHING APPARATUS

John Evans, Princeton, N. J., assignor to Radio Corporation of America, a corporation of Delaware Application May 29, 1950, Serial No. 165,003

3 Claims. (Cl. 178—5.4)

This invention relates to apparatus for utilizing the ultra-violet light produced by a phosphorescent screen of a cathode ray tube for control purposes.

Although the principle of this invention has a wide application, it will be discussed in connection with a color television system. In one such system, the transmitted signal successively represents the intensities of each of a plurality of component colors. At the receiver the signals are applied to a distributor which applies them to corresponding color reproducing means. The signals can, therefore, be said to be time division multiplexed and the ratio between the multiplexing speed and the scanning operations in the television system can be different. For example, the change in colors can take place once every field as in the field sequential system or once every line as in some line sequential systems or numerous times within a given line such as in dot sequential systems.

Generally speaking, however, these signals are reproduced by various forms of cathode ray tubes. The construction of these tubes depends somewhat upon the type of sequential system being employed. For example, in the line sequential system, tubes have been devised in which the different color phosphors are laid down on horizontal or vertical lines. On the other hand, where the tube is to be used with the dot sequential systems, the phosphors have been arranged in groups, each group containing a plurality of phosphors each of which produces light of a different component color. Whereas some of these tubes may be used interchangeably, they operate most efficiently when employed in a system for which they were designed.

Therefore, it is an object of this invention to provide an improved apparatus whereby the colored images may be reproduced from any type of sequential signal.

It is a further object of the invention to provide an improved apparatus for coordinating the application of the modulation signals to a cathode ray tube with the light actually being reproduced by the tube.

Briefly, these objectives can be accomplished by utilizing the different ultra-violet radiations produced by the phosphors of a cathode ray tube.

These and other objects will become apparent from a detailed consideration of the drawings in which.

Figure 1:
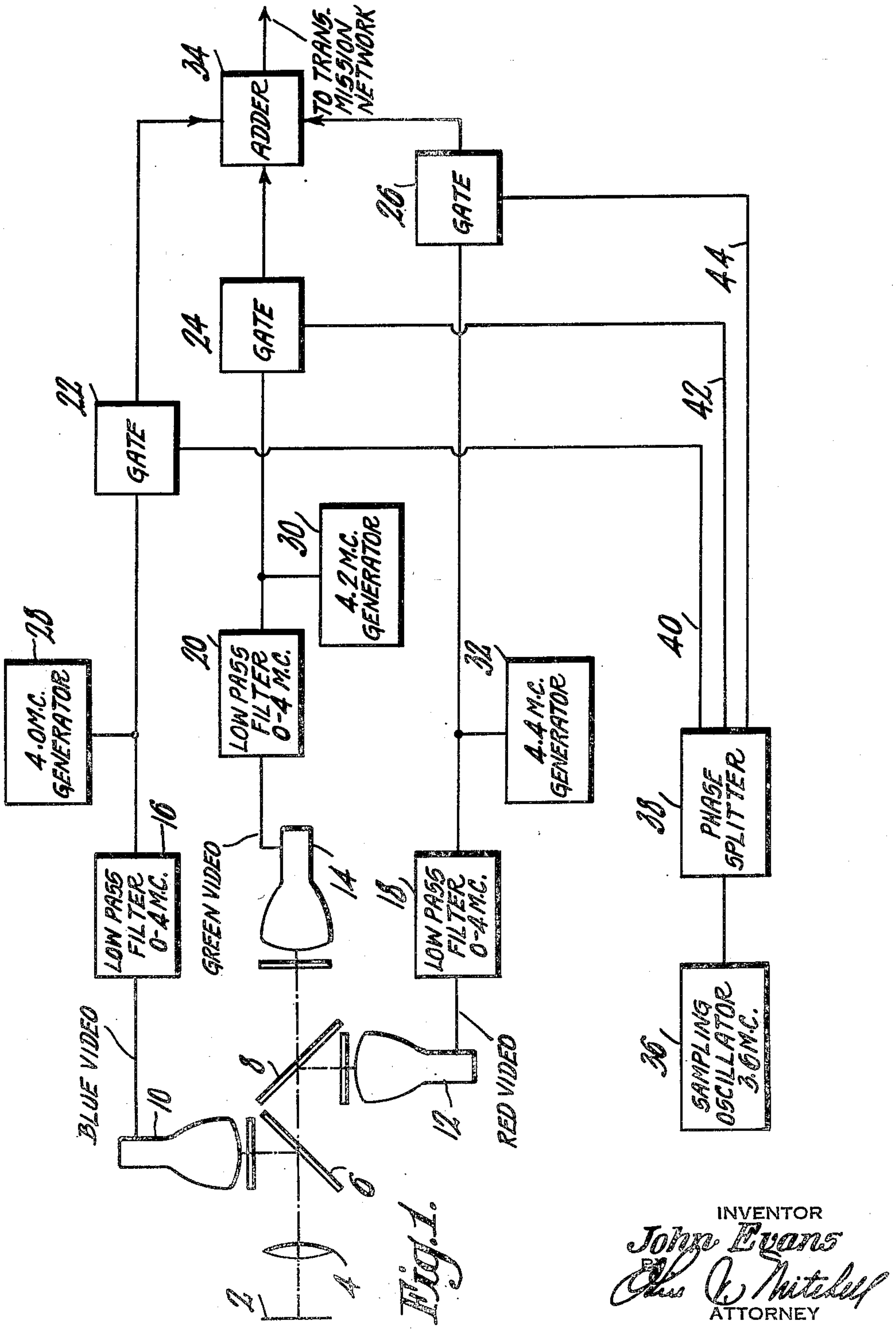
Figure 1 illustrates a transmitter that may be employed to convey sequential signals to a receiver.

The object 2 to be televised (see Figure 1) is focused by a lens system 4 on to two dichroic mirrors 6 and 8. The dichroic filter 6 reflects the blue light to the pick-up tube 10 and passes red and green light. The dichroic filter 8 reflects the red light to a pick-up tube 12 and passes the green light to a pick-up tube 14. The video signals generated by the pick-up tubes 10, 12 and 14, pass through low pass filters 16, 18 and 20 respectively. In the numerical example to be given, the upper frequency limit of these low pass filters is established at 4 mc. The output of the low pass filter 16 is applied to a conventional gating circuit 22. The output of the low pass filter 20 is applied to a similar gating circuit 24, and the output of the low pass filter 18 is applied to another gate 26. A 4 mc. sinusoidal generator 28 is also connected to an input of the gate 22, a 4.2 mc. sine wave generator 30 is connected to the input of the gate 24, and a 4.4 mc. generator 32 is applied to the gate 26. The outputs of the gates 22, 24 and 26 are combined in an adder 34, and the output of the adder is applied to any suitable transmission network.

The gates 22, 24 and 26 are successively rendered capable of passing the signals applied to them by the following means. A sampling oscillator 36 generates in this particular example a 3.6 mc. sine wave which is applied to a phase splitter 38. The phase splitter has three separate outputs, each of which is 120 degrees displaced from the other. The output leads are connected so as to open the corresponding gates during the positive peaks of the 3.6 mc. sine wave, the output lead 40 being connected so as to open gate 22, the output lead 42 being connected so as to open the gate 24, and the output lead 44 being connected so as to open the gate 26. In this way, the gate 22 passes the blue video signals and the 4 mc. signal for a short interval of time, and then the gate 24 passes the green video signals and a 4.2 mc. signal for a succeeding interval. The gate 26 then passes red video signals and a 4.4 mc. signal for a third successive interval of time. This cycle of operation is then repeated. The transmitted signal thus successively represents the blue, green and red video intensities as well as the 4.0 mc., 4.2 mc. and 4.4 mc. frequencies.

Figures 2, 2A:
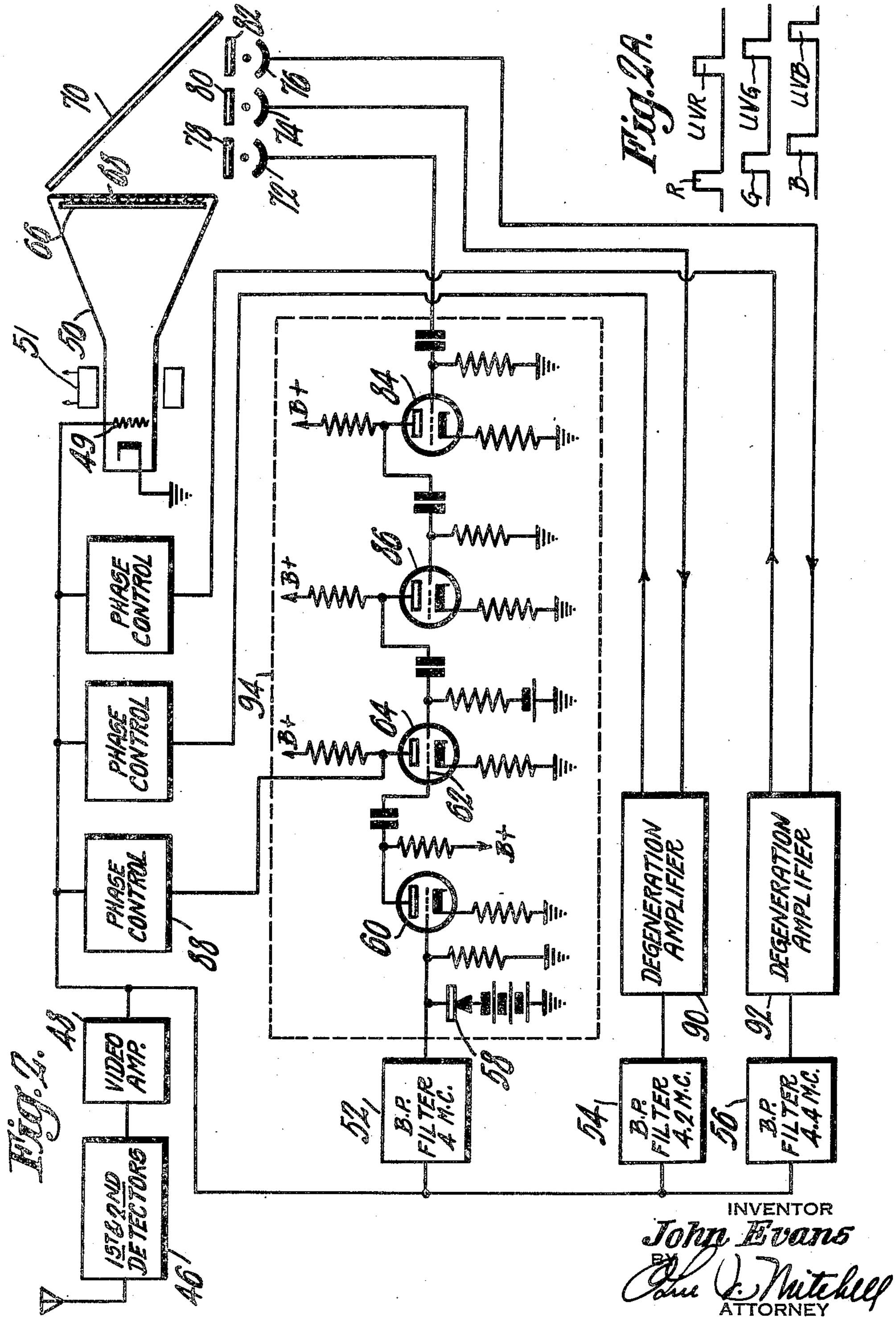
Figure 2 shows partially in schematic and partially in block diagram form the embodiment of the invention in a color television receiver.
Figure 2A illustrates the characteristics of certain light filters employed in the apparatus of Figure 2.

Figure 2 illustrates a receiver that is adapted to reproduce colored images from signals such as those transmitted from the apparatus just described in connection with Figure 1. A television receiver 46 having the usual first and second detectors differs only from the conventional television receiver in that its video pass band goes up to as high as 4.4 mc. A conventional television receiver can be used if the video signals are restricted to a lower frequency, thereby permitting the frequencies of the signal generators 28, 30 and 32 to also be lower. The signals thus detected are applied to a video amplifier 48. The output of the video amplifier 48 is applied to a grid 49 of a special cathode ray tube 50 so as to modulate the intensity of a beam of electrons in the cathode ray tube 50. The details of this tube will be described below. The output of the video amplifier 48 is also applied to very narrow band pass filters 52, 54 and 56. The band pass filter 52 passes only 4 mc. signals, the band pass filter 54 passes only 4.2 mc. signals, and the band pass filter 56 passes only 4.4 mc. signals.

The output of the band pass filter 52 is detected by a crystal detector 58 and is applied to an amplifier 60. The output of the amplifier 60 is coupled to a grid 62 of an amplifier 64 in such a manner as to cut off the amplifier 64 when the band pass filter 52 passes the 4 mc. signals.

The special cathode ray tube 50 is provided with a screen of white phosphor 66 and apparatus for scanning this phosphor with a cathode ray beam in the usual manner. In front of the phosphor, however, are a plurality of light filters 68. These filters may be arranged at random or they may be arranged in accordance with any desired geometric pattern. One group of these filters passes red light, another group may pass the green light, and a third group passes the blue light. It is characteristic of certain light filters that they pass a portion of invisible ultra-violet light in addition to visible light. These characteristics are best illustrated by reference to 2A wherein it will be noted that the ultra-violet light passed by the red, green and blue filters lies in different portions of the ultra-violet spectrum. It is characteristic of the phosphors that the ultra-violet light is produced more rapidly than the light in the visible spectrum. That is to say, the phosphor produces ultra-violet light sooner than it produces light in the visible spectrum.

In front of the cathode ray tube 50 a partially silvered mirror 70 is positioned so as to reflect the ultra-violet light towards three separate photoelectric cells 72, 74 and 76. Between the photoelectric cells 72, 74 and 76 and the mirror 70, blue, green and red filters 78, 80 and 82 are respectively mounted. These light filters are the same as the different groups 68. Thus, when the cathode ray beam strikes a portion of the screen 66 behind the light filter 68 that passes blue light, the associated ultra-violet light will be passed by the filter 78 and impinge upon the photoelectric cell 72. This generates a signal which is coupled by a pair of amplifiers 84 and 86 to the grid 62 of the amplifier 64. The output of the amplifier 64 is applied through a suitable phase control device 88 to the grid 49 of the cathode ray tube 50.

The polarity of these signals is opposite to that of the output of the viodeo amplifier 48. Therefore, the signals derived by the photoelectric cell 72 are applied in a degenerative sense to the grid 49 as long as the amplifier 64 is operative. However, when a 4 mc. signal is present, the amplifier 64 is rendered inoperative and the signals developed by the photoelectric cell 72 are not applied to the grid 49 of the cathode ray tube 50. Thus, the video signals are applied to the grid 49.

The outputs of the band pass filters 54 and 56 are supplied to degeneration amplifiers 90 and 92 respectively. The amplifiers are shown in block diagram form but are understood to include the circuitry enclosed within the dotted rectangle 94. The output of the photoelectric cell 74 is applied to the degeneration amplifier 90 and the output of the photoelectric cell 76 is applied to the degeneration amplifier 92.

The overall operation of the receiver shown in Figure 2 is as follows. It will be remembered that whenever a blue signal was transmitted it was accomplished by a 4 mc. signal. The 4 mc. signal is passed by the band pass filter 52 and employed to prevent the signals derived by the photoelectric cell 72 from being applied degeneratively to the grid 49 of the cathode ray tube 50. When, however, a green video signal is being transmitted, it is accompanied by a 4.2 mc. signal and the amplifier 64 in the blue channel remains operative. Therefore, whenever the beam strikes the screen 66 at a point behind a blue portion of the light filter 68, the ultra-violet radiations picked up by the photo-cell 72 are applied through the amplifier 64 so as to degenerate the signal applied to the grid 49. In other words, when the light produced by the cathode ray tube 50 corresponds to the signals provided at that instant by the video amplifier 48, the signals provided by the corresponding photoelectric cell are not applied in a degenerative sense. Whenever the beam in the cathode ray tube 50 emits light that does not correspond to the video signals present at the output of the video amplifier 48, the signals applied to the grid 49 are completely degenerated. If the filters or light radiating instrumentalities 68 are sufficiently small, the cathode ray beam will always pass over some that radiate visible light corresponding to the signals being supplied by the receiver 46.

One other important fact in the operation of the device is that the ultra-violet radiations generally reach their maximum intensity before the radiations in the visible spectrum. Therefore, the degeneration of the signals can be brought about before the visible light is produced.

Having thus described my invention, what is claimed is:

1. An apparatus for modulating an electron beam of a cathode ray tube so that the color of a portion of an image being formed by its scanning action corresponds to the color represented by a given signal comprising in combination a cathode ray tube, a screen in said cathode ray tube that emits radiations when struck by a beam of electrons that lie respectively within the visible spectrums and the invisible, means for scanning said screen with a beam of electrons, means for modulating the intensity of said beam in accordance with said given signal, a plurality of groups of filters positioned in front of said screen, each group of filters being adapted to pass different predetermined portions of the visible and invisible spectrums, means adapted to produce signals in response to the invisible radiations transmitted by filters in at least one of said groups, means for coupling said signals to said means for controlling the intensity of the beam of electrons in a degenerative sense, means for disabling said coupling means when the given signal corresponds to the portion of the visible spectrum transmitted by said filters in said one group.

2. An apparatus for reproducing images in color from signals that successively represent the intensities of different component colors derived from scanning a given object comprising in combination a source of said signals, a cathode ray tube, means for controlling the intensity of the beam of electrons associated with said cathode ray tube in accordance with said signals, means for causing the beam of electrons associated with said cathode ray tube to scan in synchronism with the scanning of said object, a phosphor screen positioned so as to be struck by said beam of electrons, a plurality of groups of light filters mounted on the viewing side of said screen, the filters in each group being adapted to pass different predetermined portions of the visible and invisible spectrums, a plurality of photoelectric cells, means for reflecting radiation in the invisible spectrum that pass through said groups of filters toward said cells, filters associated with each of said cells that pass the invisible radiations passed by one of said groups of filters, a degeneration circuit connected between each of said cells and said intensity controlling means, and means for disabling the one of said degeneration circuits that is responsive when the color in the visible spectrum supplied by one of said groups of filters corresponds to the signal provided by said source.

3. In a color television system wherein the transmitted signal includes a video signal that successively represents the intensities of the different selected component colors and a color indicating signal having a characteristic that changes in synchronism with the change in the color represented by the video signal, a receiver comprising in combination means for receiving the video and color indicating signals, a cathode ray tube arrangement adapted to successively emit visible light of a different selected component color and corresponding different radiations in the invisible spectrum as the beam scans a raster, a beam intensity control electrode mounted within said tube and means for coupling the video signals to said electrode, a plurality of photoelectric devices adapted to produce a voltage wave corresponding to the intensity of the visible or invisible radiation falling on it, means for directing each of the different invisible radiations to a different one of said photoelectric devices, means for degeneratively coupling the voltage wave appearing at the output of said photoelectric devices to said control electrode so as to substantially cancel the video signal applied thereto, a plurality of electrical means each responsive to a different characteristic of said color indicating signals, means for preventing each of said degenerative coupling means for cancelling the video signals, each of said latter means being responsive to the output of one of said electrical means.

References Cited in the file of this patent

UNITED STATES PATENTS

| Number | Name | Date |
|---|---|---|
| 2,415,059 | Zworykin | Jan. 28, 1947 |
| 2,490,812 | Huffman | Dec. 13, 1949 |
| 2,545,325 | Weimer | Mar. 13, 1951 |
| 2,553,182 | Cage | May 15, 1951 |
| 2,587,074 | Sziklai | Feb. 26, 1952 |
| 2,621,244 | Landon | Dec. 9, 1952 |